(12) United States Patent
Yanagawa et al.

(10) Patent No.: US 6,317,400 B1
(45) Date of Patent: Nov. 13, 2001

(54) OPTICAL PICKUP APPARATUS

(75) Inventors: Naoharu Yanagawa; Shinichi Nagahara, both of Tokorozawa (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/343,285

(22) Filed: Jun. 30, 1999

(30) Foreign Application Priority Data

Jun. 30, 1998 (JP) .................................................. 10-185332

(51) Int. Cl.[7] ........................................................ G11B 7/00
(52) U.S. Cl. .................................. 369/53.26; 369/112.19; 369/112.21
(58) Field of Search .......................... 369/53.26, 112.19, 369/112.21, 112.28

(56) References Cited

U.S. PATENT DOCUMENTS 5,189,655 * 2/1993 Ogata et al. .
5,546,373   8/1996 Koyama .
5,563,870 * 10/1996 Silverstein .

FOREIGN PATENT DOCUMENTS 0 289 304  11/1988 (EP) .
0 786 839   7/1997 (EP) .

OTHER PUBLICATIONS

Patent Abstracts of Japan, vol. 1, No. 369 (P–525), Dec. 10, 1986, for JP61–162838.
Patent Abstracts of Japan, vol. 14, No. 321 (P–1074), Jul. 10, 1990, for JP2–105341.
Patents Abstracts of Japan, vol. 96, No. 11, Mar. 31, 1997, for JP 8–287505.

* cited by examiner

*Primary Examiner*—W. R. Young
(74) *Attorney, Agent, or Firm*—Pitney, Hardin, Kipp & Szuch LLP (57) ABSTRACT

An optical pickup apparatus is provided with: a light source (20) for emitting a light beam; an optical system (21, 22, 24, 25, 26, 27), which comprises an optical element (24) having an incident surface (24a), to which an AR (Anti-Reflection) coat is not applied and to which the light beam emitted from the light source is inputted obliquely by a predetermined incident angle, for guiding one portion of the emitted light beam transmitted through the incident surface onto an information record medium (32) and guiding a reflection light of one portion of the emitted light beam reflected from the information record medium, and also reflecting another portion of the emitted light beam by the incident surface; a main light detector (30) for receiving the reflection light from the information record medium guided by the optical system and outputting a main detection signal corresponding to record information recorded on the information record medium; a monitor detector (23) for receiving another portion of the emitted light beam reflected by the incident surface of the optical element and outputting a monitor detection signal corresponding to a light amount received by the monitor detector; and a controlling device (31) for controlling an output power of the light beam emitted from the light source on the basis of the monitor detection signal.

6 Claims, 4 Drawing Sheets

OPTICAL PICKUP APPARATUS

BACKGROUND OF THE INVENTION

1. Field of the Invention

The present invention generally relates to an optical pickup apparatus used for recording and reproducing record information by emitting a light beam from a light source onto an information record medium, and more particularly to an optical pickup apparatus for performing a power control of the light beam by detecting the light amount of the light beam emitted from the light source by means of a front monitor method.

2. Description of the Related Art

In a semiconductor laser as a light source of the optical pickup, since the emission power is changed due to a temperature change and aging, a stabilization of the power level of the light beam emitted onto the information record medium such as an optical disc is performed by conducting a power control by means of the APC (Automatic Power Control). As a representative method of this APC, there is a rear monitor method and a front monitor method.

Since, in the rear monitor method, the light beam emitted from the end surface of the semiconductor laser on the opposite side of the emission surface, there is a problem in a detection accuracy etc., resulting in that the front monitor is in fact employed. In the front monitor method, one portion of the light beam emitted from the semiconductor laser is monitored and is fed-back to a driving circuit of the semiconductor laser, so as to keep constant the power of the light beam.

For example, in the front monitor method, the light beam emitted from a semiconductor laser is inputted to a beam splitter. This beam splitter has a half reflection film, which transmits about 90% of the light beam emitted from the semiconductor laser and reflects the rest of it i.e., about 10% of it. By the action of this half reflection film of the beam splitter, about 90% of the light beam inputted to the beam splitter is transmitted therethrough to an optical disc through some more optical elements such as an objective lens.

On the other hand, about 10% of the light beam, which is reflected by the half reflection film of the beam splitter, is guided to a front monitor detector. The front monitor detector outputs an electric signal corresponding to a light amount of the emitted light beam. This electric signal is supplied to an APC circuit including a laser control circuit for performing a power control of the semiconductor laser. The APC circuit obtains a driving signal optimum for driving the semiconductor laser in accordance with the electric signal from the front monitor detector. In this manner, the output power of the semiconductor laser is controlled by the APC circuit on the basis of the electric signal outputted from the front monitor detector.

However, in the above mentioned optical pickup apparatus employing the front monitor method, since about 10% of the light beam is reflected by the half reflection film of the beam splitter and is guided to the front monitor detector, the power of the light beam emitted onto the optical disc is correspondingly reduced, resulting in that the usage efficiency of the light beam is reduced, which is a problem.

Further, since the property of the half reflection film of the beam splitter such as the reflectivity, the transmissibility or the like has a dispersion of about ±5%, it is necessary to suppose the change in the reflection of the light beam within a wide range of 5% to 15%, so that the design and the adjustment become difficult to perform. Furthermore, the property such as the reflectivity, the transmissibility or the like of the half reflection film of the beam splitter is changed in accordance with the environmental temperature, the humidity and the like, it becomes a problem that the reliability of the power control by means of the APC is certainly degraded.

SUMMARY OF THE INVENTION

It is therefore an object of the present invention to provide an optical pickup apparatus, which can keep the usage efficiency of the light beam high and which is hardly influenced by the dispersion of the production or the environmental change, to thereby perform a highly reliable APC.

The above object of the present invention can be achieved by an optical pickup apparatus provided with: a light source for emitting a light beam; an optical system, which comprises an optical element having an incident surface, to which an AR (Anti-Reflection) coat is not applied and to which the light beam emitted from the light source is inputted obliquely by a predetermined incident angle, for guiding one portion of the emitted light beam transmitted through the incident surface onto an information record medium and guiding a reflection light of one portion of the emitted light beam reflected from the information record medium, and also reflecting another portion of the emitted light beam by the incident surface; a main light detector for receiving the reflection light from the information record medium guided by the optical system and outputting a main detection signal corresponding to record information recorded on the information record medium; a monitor detector for receiving another portion of the emitted light beam reflected by the incident surface of the optical element and outputting a monitor detection signal corresponding to a light amount received by the monitor detector; and a controlling device for controlling an output power of the light beam emitted from the light source on the basis of the monitor detection signal.

According to the optical pickup apparatus of the present invention, the light beam emitted from the light source such as a semiconductor laser is inputted to the incident surface of the optical element obliquely by the predetermined incident angle. At this time, since the AR coat is not applied to this incident surface of the optical element, the portion of the light beam is reflected by a predetermined reflection coefficient and is received by the monitor detector. Then, the monitor detection signal is outputted by the monitor detector and is fed back to the light source through the controlling device, so that the output power of the light beam is controlled by the controlling device. Therefore, the reflection coefficient of the incident surface (i.e., the half reflection surface) of the optical element with respect to the monitor detector is determined to be constant mainly in dependence upon the incident angle. Accordingly, the light amount which can be kept in stable is reflected and guided to the monitor detector, so that it is possible to perform the highly reliable APC of the front monitor method which is hardly influenced by the temperature or humidity.

In one aspect of the optical pickup apparatus of the present invention, the optical element has a shaped prism.

According to this aspect, in case of constructing the optical system by the shaped prism, it is enough not to apply the AR coat to the incident surface of the shaped prism. Thus, it is possible to perform the APC of the front monitor method and it is possible to realize a highly reliable APC without the change due to the temperature or humidity, by use of a rather simplified structure while employing an existing optical system.

In another aspect of the optical pickup apparatus of the present invention, the optical element has a polarization beam splitter.

According to this aspect, in case of constructing the optical system by the polarization beam splitter, it is enough not to apply the AR coat to the incident surface of the polarization beam splitter. Thus, it is possible to perform the APC of the front monitor method and it is possible to realize a highly reliable APC without the change due to the temperature or humidity and with little light amount loss, by use of a rather simplified structure while employing an existing optical system.

In another aspect of the optical pickup apparatus of the present invention, the optical element comprises a shaped prism including a polarization beam splitter.

According to this aspect, in case of constructing the optical system by the shaped prism including the polarization beam splitter, it is enough not to apply the AR coat to the incident surface of the shaped prism. Thus, it is possible to perform the APC of the front monitor method and it is possible to realize a highly reliable APC without the change due to the temperature or humidity and with little light amount loss, by use of a rather simplified and miniaturized structure while employing an existing optical system.

In another aspect of the optical pickup apparatus of the present invention, the AR coat is applied to reflection or incident surfaces for the light beam of the optical element other than the incident surface to which the AR coat is not applied.

According to this aspect, since the AR coat is applied to the reflection or incident surfaces of the optical element other than the incident surface to which the light emitted from the light source is inputted, it is possible to reduce the light amount loss to the minimum level. Further, the capability deterioration due to the stray light is also reduced, so that it is possible to realize a highly reliable APC.

In another aspect of the optical pickup apparatus of the present invention, the controlling device comprises an APC (Automatic Power Control) circuit for comparing the monitor detection signal with a predetermined reference signal and generating a driving signal to drive the light source so that a difference between the compared signals approaches zero.

According to this aspect of the optical pickup apparatus of the present invention, when the monitor detection signal is outputted by the monitor detector, the APC is performed by the APC circuit, in which the monitor detection signal is compared with the predetermined reference signal, and the driving signal is generated to be fed back to the light source. Thus, the light amount of the light source can be kept constant and in stable.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

Figure 1A:
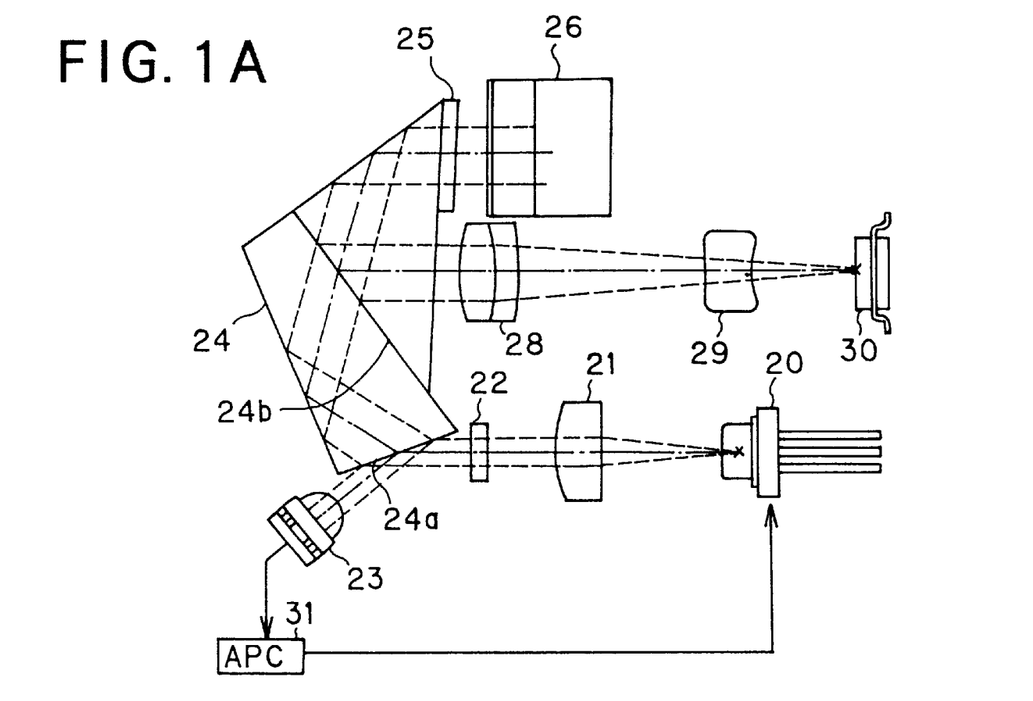
FIG. 1A is a diagram showing a whole structure of an optical system of an optical pickup apparatus of an embodiment of the present invention.
Figure 1B:
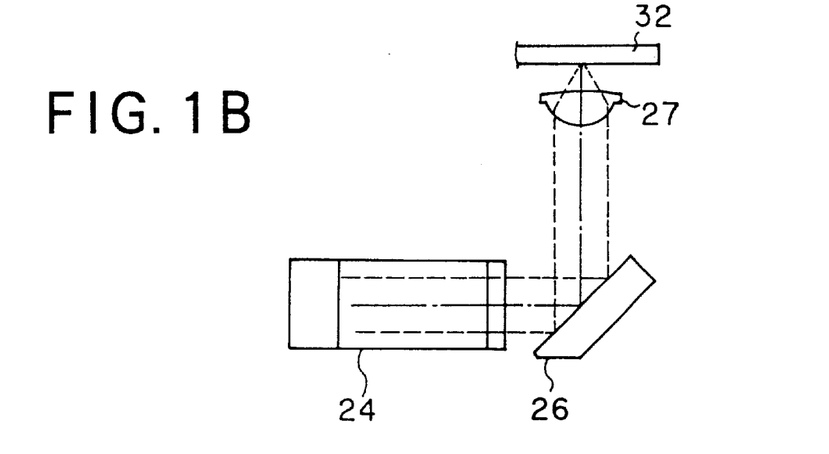
FIG. 1B is a side view of the optical pickup apparatus at a portion near an optical disc of the embodiment.

FIG. 1A and FIG. 1B are diagrams showing a schematic structure of an optical pickup apparatus of the embodiment.

In FIG. 1A and FIG. 1B, the optical pickup apparatus is provided with: a semiconductor laser 20 as a light source; a collimator lens 21; a grating 22; a front monitor detector 23 as a detecting device; a shaped prism 24; a ¼ wavelength plate 25; a reflection prism 26; an objective lens 27 (in FIG. 1B); a collecting lens 28; a multiple lens 29; a detector 30; and an APC circuit 31.

In FIG. 1A, the light beam emitted from the semiconductor laser 20 is collimated by the collimator lens 21 and is diffracted by the grating 22 to be separated into a main beam and two sub beams for the tracking servo control.

The light beam transmitted through the grating 22 is inputted to a reflection surface (i.e., an incident surface) 24a of the shaped prism 24. At this time, the shaped prism 24 is disposed such that the normal line of the reflection surface 24a forms a predetermined angle θ1 with respect to an optical axis of the light beam. An AR (Anti-Reflection) coat is applied to the surfaces of the prism 24 except for the reflection surface 24a as described later in detail. Thus, one portion of the inputted light beam is reflected by the reflection surface 24a so that the APC by means of the front monitor method is performed by use of the reflection light, which is described later in detail.

The light beam transmitted through the reflection surface 24a is passing through the reflection film 24b and is guided to the ¼ wavelength plate 25. The reflection film 24b has such a characteristic to transmit about 100% of the light beam in the P polarization while reflecting about 100% of the light beam in the S polarization for example. Therefore, by making the light beam emitted from the semiconductor laser 20 in the P polarization, it is possible to appropriately separate the optical path on the emitting side and the optical path on the receiving side.

The light beam transmitted through the reflection film 24b is reflected in a direction perpendicular to a surface plane of FIG. 1A by the reflection prism 26 through the ¼ wavelength plate 25. Here, FIG. 1B shows a side view of FIG. 1A. As shown in FIG. 1B, the light beam is reflected approximately perpendicularly by the reflection prism 26. After that, the light beam is guided to the objective lens 27, and is collected onto the information record surface of the optical disc 32 so as to form a beam spot.

The light beam reflected from the information record surface of the optical disc 32 is passing through the objective lens 27 again and is reflected by the reflection prism 26. Then, the polarization plane of the light beam is rotated by the ¼ wavelength plate 25 so that the light beam becomes the light beam in the S polarization and is guided to the shaped prism 24. Then, the light beam in the S polarization is reflected by the reflection film 24b of the shaped prism 24 and is guided to the detector 30 through the collection lens 28 and the multiple lens 29. The multiple lens 29 has a function of a cylindrical lens and a concave lens so as to give an astigmatism to the light beam.

The detector 30 outputs an electric signal proportional to the light amount of the detected or received light beam. The record information (e.g., video information, audio information, data information) is demodulated on the basis of this electric signal. On the other hand, since the astigmatism is given to the light beam by the multiple lens 29, it is possible to conduct the focus error detection by means of the astigmatism method. Further, it is possible to conduct the tracking error detection by means of the 3 beams method by using the two sub beams generated by the grating 22.

On the other hand, one portion of the light beam reflected by the reflection surface 24a of the shaped prism 24 is emitted onto the front monitor detector 23, so that a detection signal proportional to the power of the light beam is outputted from the front monitor detector 23. This detection signal is compared with a predetermined reference value in the APC circuit 31, so as to generate a driving signal corresponding to a difference between the detection signal and the reference value, which is then supplied to the semiconductor laser 20. By this, the power of the light beam emitted from the semiconductor laser 20 is controlled, and the feed back is performed so that the difference between the detection signal of the front monitor detector 23 and the reference signal approaches zero. Namely, a feed back control is performed so as to keep the power of the light beam constant.

Next, the transmission and the reflection of the light beam at the reflection surface 24a of the shaped prism 24 are explained in more detail with reference to FIG. 2 and FIG. 3.

In general, the AR coat is applied on each of the incident surface and the reflection surface of the shaped prism 24. Namely, the AR coat is a non-reflection coat by coating a material such as silicon on a surface of an optical element so as to increase the transmission amount of the light beam in comparison with the case of non-coating. Since the reflection of the light beam can be restricted on the surface to which the AR coat is applied, it is possible to prevent the noise from being mixed into the detection signal as the stray light is generated due to the unnecessary reflection of the light beam in the optical system for example. Further, in case that the AR coat is not applied at all, since the loss of about 5% of the light beam is caused, and that the loss at the incident surface and the loss at the reflection surface become as much as about 10% in total. Consequently, the AR coat has an effect to restrain the loss of the light beam in this kind.

In the present embodiment, in order to perform the APC of the front monitor method, the AR coat is not applied to the reflection surface 24a. Namely, in the aforementioned front monitor method by use of the action of the reflection film of the beam splitter, the usage efficiency of the light beam is low while it is subject to the influence of the temperature, the humidity and the like. In contrast, according to the present invention, there is no problem like this. Namely, according to the present invention, as described later in detail, the loss of the light beam is restrained to be only about 5% of the light beam incident to the reflection surface 24a, while the reflection amount of the light beam at the reflection surface 24a is stable against the change of the temperature or the humidity.

Figure 2:
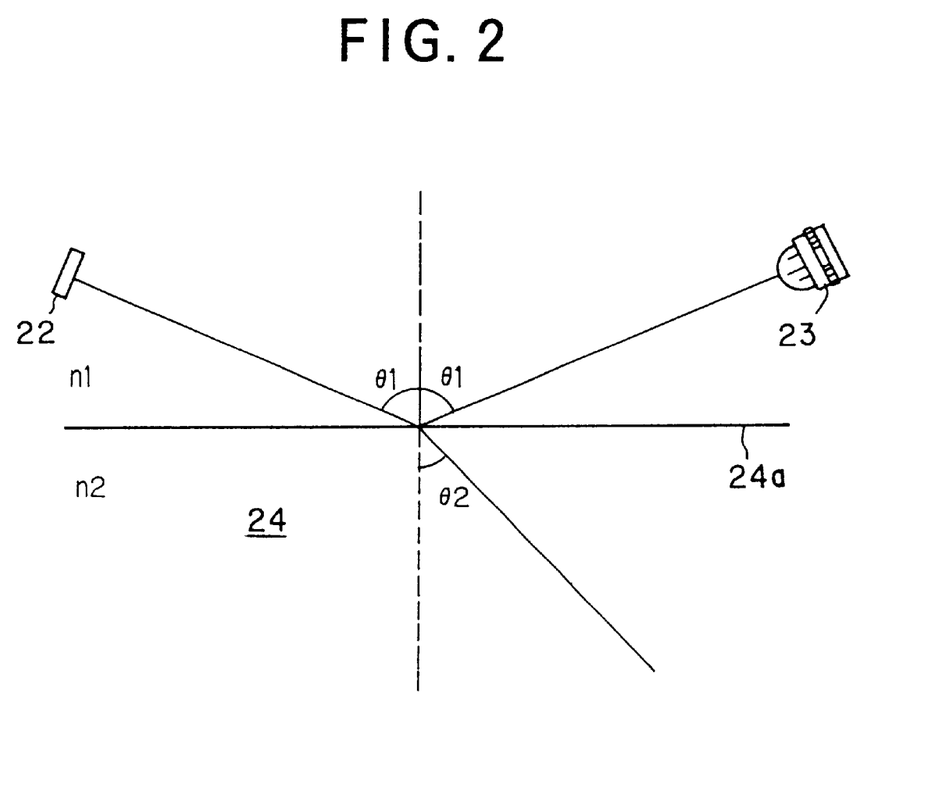
FIG. 2 is an enlarged diagram showing an optical path in a vicinity of a reflection surface of a shaped prism in the optical pickup apparatus of the embodiment.

Here, FIG. 2 is a diagram showing the optical path in the vicinity of the reflection surface 24a of the shaped prism 24 of FIG. 1 in an enlarged scale. As shown in FIG. 2, when the light beam transmitted through the grating 22 is incident to the reflection surface 24a by the incident angle θ1, a following expression (1) is concluded according to the Snell's law.

$$n1 \times \sin\theta1 = n2 \times \sin\theta2 \quad (1)$$

Here, n1 and n2 represent refraction coefficients of the mediums on both sides of the reflection surface 24a respectively, and it is approximated that n1=1. In the present embodiment, it is assumed that n2, which is the refraction coefficient of the material of the shaped prism 24, is 1.515. On the other hand, the reflection coefficient R at the reflection surface 24a can be obtained by a following expression (2).

$$R = \tan^2(\theta1-\theta2)/\tan^2(\theta1+\theta2) \quad (2)$$

Here, θ1 is set to 70.7 degrees in the present embodiment. θ2 is calculated from the expression (1) to be about 38.5 degrees. Therefore, by assigning these values into the expression (2) so as to calculate the reflection coefficient R, the result of about 4.8% is obtained.

Namely, among the light beam incident to the reflection surface 24a, about 4.8% is reflected and is guided to the front monitor detector 23, which is set in the direction symmetrical to the incident angle θ1. Further, the rest of the light beam i.e., about 95.2% of the light beam is transmitted through the reflection surface 24a to advance in the direction of the angle θ2, and is emitted onto the optical disc 32. In this way, since the reflection coefficient R is determined by the expression (2), and since each of the parameters θ1, θ2 and n2 is hardly influenced by the environment such as the temperature, the humidity and the like, it is possible to keep the stable light amount.

Incidentally, the above mentioned incident angle θ1, the reflection coefficient R and so on are just related to one example. It is possible to emit the light beam of enough light amount, which is freely set in the range where the APC can be conducted in a stable manner, onto the optical disc 32.

Here, in order to confirm the above mentioned advantageous effect of the present embodiment, a comparison example is explained with reference to FIG. 3. In the comparison example, the AR coat is applied to all of the reflection surfaces of a beam splitter which corresponds to the shaped prism 24 in the present embodiment.

Figure 3:
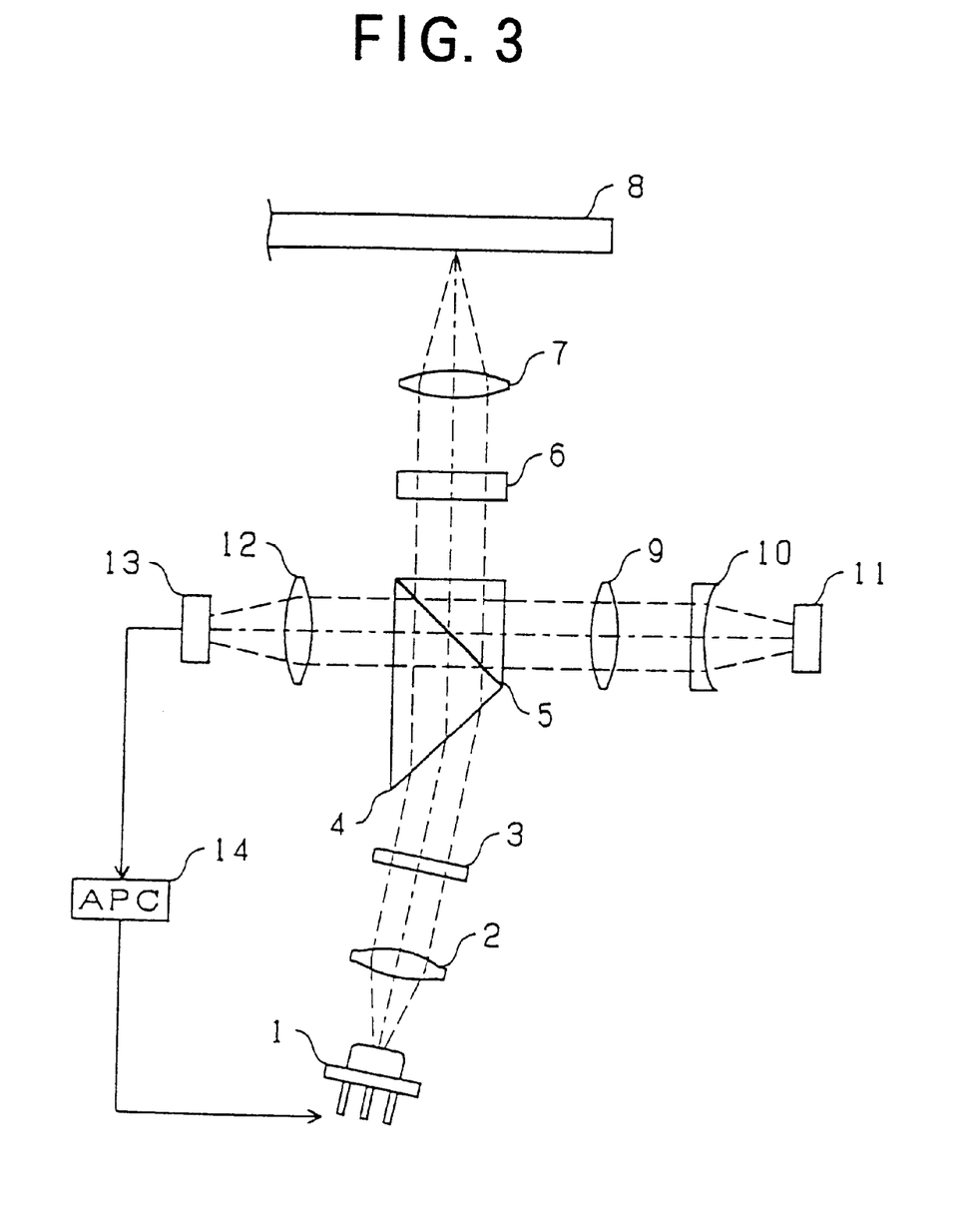
FIG. 3 is a diagram showing a whole structure of an optical pickup apparatus employing a front monitor method in a comparison example.

FIG. 3 is a diagram showing a schematic construction of an optical pickup apparatus employing the front monitor method in the comparison example. In FIG. 3, the light beam emitted from a semiconductor laser 1 is collimated by a collimator lens 2 and is inputted to a beam splitter 4 through a grating 3. The grating 3 separates the incident light beam into a main beam for reading the record information from an optical disc 8 and two sub beams used for the tracking servo control.

The beam splitter 4 has a half reflection film 5, which transmits therethrough about 90% of the light beam emitted from the semiconductor laser 1 and reflects the rest of it i.e., about 10% of it. By the action of the half reflection film 5, about 90% of the light beam inputted to the beam splitter 4 is transmitted therethrough to be guided to a ¼ wavelength plate 6 and about 10% of it is reflected to be guided to a collection lens 12. The light beam guided to the ¼ wavelength plate 6 is collected by an object lens 7 on an information record surface of the optical disc 8, so as to form a beam spot having a predetermined size.

The light beam collected on the information record surface on the optical disc 8 is reflected and is inputted to the reflection film 5 of the beam splitter 4 through the object lens and the ¼ wavelength plate 6. Since the reflection film 5 has such a character of reflecting about 100% of the light beam from the direction of the optical disc 8, the light beam inputted to the reflection film 5 this time is guided though the collection lens 9 and a cylindrical lens 10 for giving an astigmatism to the light beam to a light detector 11.

On the other hand, among the light beam emitted from the semiconductor laser 1, about 10% of the light beam, which is reflected by the reflection film 5 of the beam splitter 4, is collected by the collection lens 12 and is emitted onto a front monitor detector 13.

The front monitor detector 13 outputs an electric signal corresponding to a light amount of the emitted light beam. This electric signal is supplied to an APC (Automatic Power Control) circuit 14 including a laser control circuit for performing a power control of the semiconductor laser 1. The APC circuit 14 obtains a driving signal optimum for driving the semiconductor laser 1 in accordance with the electric signal from the front monitor detector 13, to thereby supplying the driving signal to the semiconductor laser 1. In this manner, the output power of the semiconductor laser 1 is controlled by the driving signal generated by the APC circuit 14 on the basis of the electric signal outputted from the front monitor detector 13.

In the above mentioned comparison example employing the front monitor method, since about 10% of the light beam is reflected by the reflection film 5 and is guided to the front monitor detector 13, the power of the light beam emitted onto the optical disc 8 is correspondingly reduced, resulting in that the usage efficiency of the light beam is reduced, which is a problem.

On the other hand, since the property of the reflection film 5 such as the reflectivity, the transmissibility or the like has a dispersion of about ±5%, it is necessary to suppose the change in the reflection of the light beam within a wide range of 5% to 15%, so that the design and the adjustment become difficult to perform. Further, the property such as the reflectivity, the transmissibility or the like of the reflection film 5 is changed in accordance with the environmental temperature, the humidity and the like, it becomes a problem that the reliability of the power control by means of the APC is certainly degraded.

In this manner, there is a serious problem in the comparison example that the usage efficiency of the light beam is low, and that the light amount of the light beam emitted from the light source is influenced by the environment such as an environmental temperature, an environmental humidity and so on.

In contrast to the above explained comparison example, according to the present embodiment as discussed before, since the AR coat is not applied to the reflection surface 24a, the loss of the light beam is restrained to be only about 5% of the light beam incident to the reflection surface 24a, while the reflection amount of the light beam at the reflection surface 24a is stable against the change of the temperature or the humidity.

The present embodiment is not limited to a case in which the light beam emitted from the semiconductor laser 20 is reflected from the whole area of the reflection surface 24a by the reflection coefficient R, but the light beam reflected with respect to just a partial area may be emitted onto the front monitor detector 23. For example, the reflection light from the main area at the central portion of the light beam, or the sub area in the peripheral portion of the light beam may be received by the front monitor detector 23, so as to conduct the APC.

According to the present embodiment, since the light amount of the light beam guided to the front monitor detector 23 is kept to be stable, the APC of the front monitor method, which can keep the output power of the semiconductor laser 20 constant and in stable even if there is the change of the temperature or humidity, can be realized. Thus, it is possible to improve the reliability of the optical pickup apparatus. At this time, by applying the AR coat to the incident surface and the reflection surface other than the reflection surface 24a for guiding the light beam to the front monitor detector 23, it is possible to restrain the light amount loss to the minimum, and at the same time possible to prevent the capability deterioration due to the stray light etc. The optical system in the present embodiment is also advantageous from the view point of the cost, since the AR coat is not applied to the reflection surface 24a of the shaped prism 24.

In the above explained embodiment, although the case in which the optical system is constructed by the shaped prism 24 having the reflection surface 24a without the AR coat has been explained, it is also possible to adapt the present invention to an optical system having no shaped prism 24.

Figure 4:
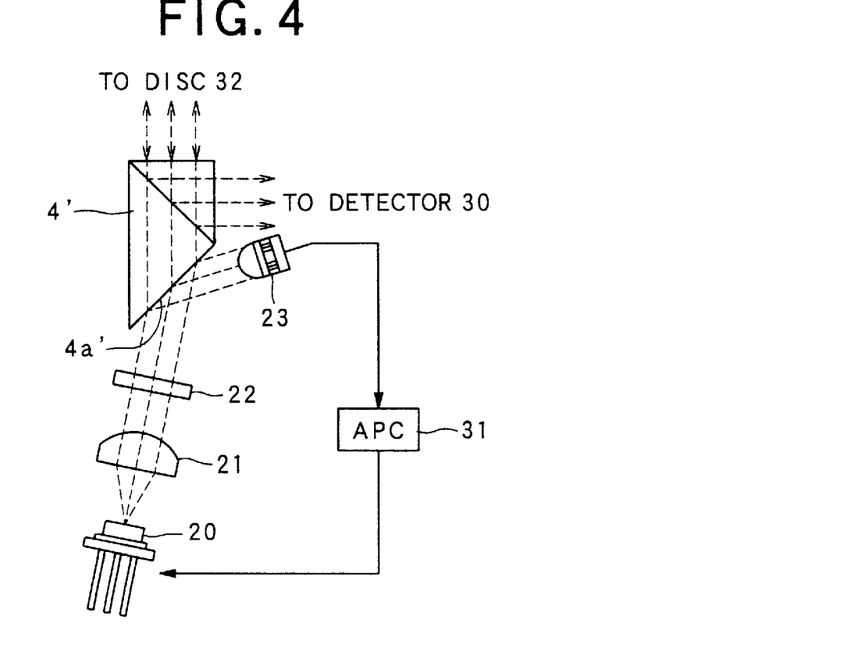
FIG. 4 is a diagram showing one modified embodiment of the present invention.

For example, as shown in FIG. 4, the front monitor detector 23 for receiving the reflection light may be provided in front of an incident surface 4a', to which the AR coat is not applied, of a polarization beam splitter 4' disposed in the optical system. In FIG. 4, the same constitutional elements as those in FIG. 1 carry the same reference numerals and the explanations thereof are omitted.

Further, in the above explained embodiment, although the reflection film 24b which functions as the polarization beam splitter is included in the shaped prism 24, it is also possible to adapt the present invention to an optical system in which the polarization beam splitter is provided separately from the shaped prism 24.

Figure 5:
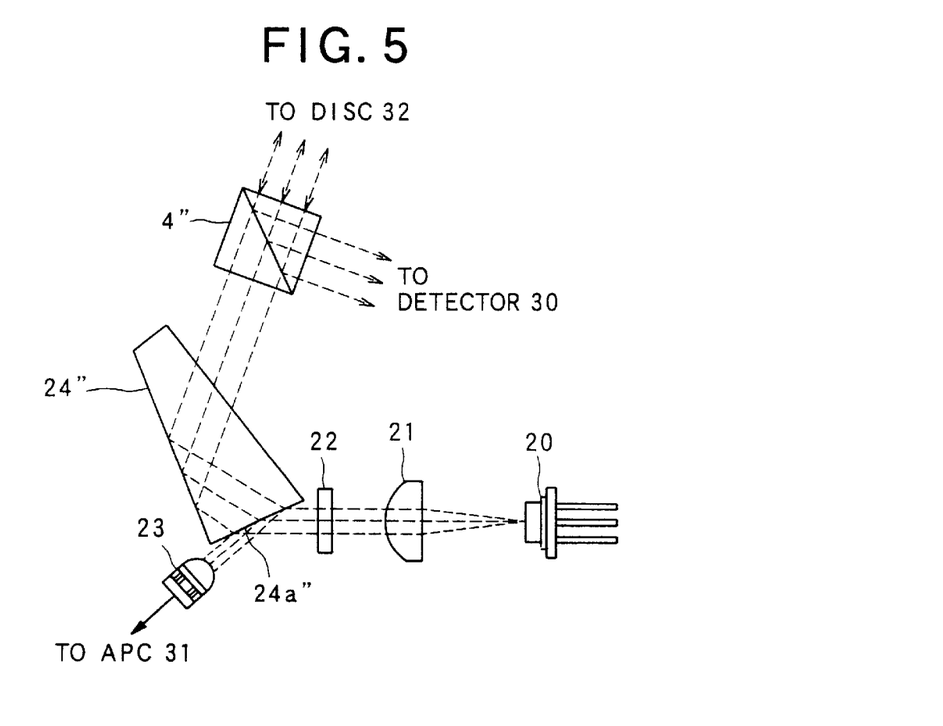
FIG. 5 is a diagram showing another modified embodiment of the present invention.

Namely, as shown in FIG. 5, a shaped prism 24" and a polarization beam splitter 4" may be disposed separately on the optical axis of the light beam. Even in this case, the AR coat is not applied to the reflection surface 24a" of the shaped prism 24", and the front monitor detector 23 for receiving the reflection light therefrom is disposed in the same manner as the present embodiment. In FIG. 5, the same constitutional elements as those in FIG. 1 carry the same reference numerals and the explanations thereof are omitted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.10-185332 filed on Jun. 30, 1998 including the specification, claims, drawings and summary is incorporated herein by reference in its entirety.

What is claimed is:

1. An optical pickup apparatus comprising:
   a light source for emitting a light beam;
   an optical system, which comprises an optical element having an incident surface, to which an AR (Anti-Reflection) coat is not applied and to which the light beam emitted from said light source is inputted obliquely by the incident angle that is equivalent to about five percent of the loss of the light beam on the reflection surface, for guiding one portion of the emitted light beam transmitted through the incident surface onto and information medium and guiding a reflection light of said one portion of the emitted light beam reflected from said information record medium, and also reflecting another portion of the emitted light beam by the incident surface;

a main light detector for receiving the reflection light from said information record medium guided by said optical system and outputting a main detection signal corresponding to record information recorded on said information record medium;

a monitor detector for receiving said another portion of the emitted light beam reflected by the incident surface of the optical element and outputting a monitor detection signal corresponding to a light amount received by said monitor detector; and a controlling device for controlling an output power of the light beam emitted from said light source on the basis of the monitor detection signal.

2. An apparatus according to claim 1, wherein said optical element comprises a shaped prism.

3. An apparatus according to claim 1, wherein said optical element comprises a polarization beam splitter.

4. An apparatus according to claim 1, where in said optical element comprises a shaped prism including a polarization beam splitter.

5. An apparatus according to claim 1, wherein the AR coat is applied to reflection or incident surfaces for the light beam of said optical element other than the incident surface to which the AR coat is not applied.

6. An apparatus according to claim 1, wherein said controlling device comprises an APC (Automatic Power Control) circuit for comparing the monitor detection signal with a predetermined reference signal and generating a driving signal to drive said light source so that a difference between the compared signals approaches zero.

* * * * *

UNITED STATES PATENT AND TRADEMARK OFFICE
CERTIFICATE OF CORRECTION

PATENT NO. : 6,317,400 B1  Page 1 of 1
DATED : November 13, 2001
INVENTOR(S) : Yanagawa et al.

It is certified that error appears in the above-identified patent and that said Letters Patent is hereby corrected as shown below:

Column 9,
Line 2, please change to read as follows:
-- onto an information medium and guiding a reflection --

Signed and Sealed this

Thirtieth Day of July, 2002

*Attest:*

*Attesting Officer*

JAMES E. ROGAN
*Director of the United States Patent and Trademark Office*